US012597777B2

(12) United States Patent (10) Patent No.: US 12,597,777 B2

Jung (45) Date of Patent: Apr. 7, 2026

(54) POWER SUPPLY UNIT FOR EXPLOSION-PROOF APPLICATIONS

(71) Applicant: Pepperl+Fuchs SE, Mannheim (DE)

(72) Inventor: Martin Jung, Mannheim (DE)

(73) Assignee: Pepperl+Fuchs SE, Mannheim (DE)

( * ) Notice: Subject to any disclaimer, the term of this patent is extended or adjusted under 35 U.S.C. 154(b) by 0 days.

(21) Appl. No.: 18/820,589

(22) Filed: Aug. 30, 2024

(65) Prior Publication Data

US 2025/0096573 A1 Mar. 20, 2025

(30) Foreign Application Priority Data

Sep. 15, 2023 (EP) .................................... 23197723

(51) Int. Cl.
| | |
|---|---|
| *H02M 1/32* | (2007.01) |
| *H02J 3/36* | (2006.01) |
| *H02M 1/36* | (2007.01) |
| *H02M 7/06* | (2006.01) |
| *H02M 7/217* | (2006.01) |

(52) U.S. Cl.
CPC ................. *H02J 3/36* (2013.01); *H02M 1/32* (2013.01)

(58) Field of Classification Search
CPC .. H02J 3/36; H02M 1/32; H02M 1/36; H02M 7/062; H02M 7/2176; H02M 7/06; H02M 7/217
USPC ........................................................ 307/104
See application file for complete search history.

(56) References Cited

U.S. PATENT DOCUMENTS

| | | |
|---|---|---|
| 2002/0000758 A1 | 1/2002 | Song |
| 2006/0083038 A1 | 4/2006 | Lynch |

FOREIGN PATENT DOCUMENTS

| | | | |
|---|---|---|---|
| CN | 209987808 U | | 1/2020 |
| DE | 3727117 | * | 2/1989 |
| DE | 3727117 A1 | | 2/1989 |
| EP | 3258744 A1 | | 12/2017 |
| WO | WO2023242836 | * | 12/2022 |

OTHER PUBLICATIONS

European Search Report issued in App. No. EP23197723, dated Feb. 28, 2024, 8 pages.

* cited by examiner

*Primary Examiner* — Elim Ortiz
*Assistant Examiner* — Xuan Ly
(74) *Attorney, Agent, or Firm* — Blueshift IP; Robert Plotkin

(57) ABSTRACT

The present invention refers to a power supply unit for operating an electronic device in an explosion-proof area, comprising:
a means (2) for providing a rectified input voltage ($U_E$);
a DC link capacitance (5) for buffering a DC link voltage;
a phase section control (4) controlled to apply the rectified input voltage to the DC link capacitance (5) during a time period in which the rectified input voltage ($U_E$) increases and is between a lower ($U_u$) and upper voltage threshold ($U_o$), and to disconnect the rectified input voltage from the DC link capacitance (5) in the remaining time periods;
a converter circuit (7) configured to convert the DC link voltage ($U_Z$) into an output voltage.

10 Claims, 3 Drawing Sheets

POWER SUPPLY UNIT FOR EXPLOSION-PROOF APPLICATIONS

TECHNICAL FIELD

The invention refers to power supply units for supplying power to electrical applications in an explosion-proof area. Further, the present invention refers to measures for simplifying a circuit design for a power supply unit for operating electrical devices in an explosion-proof area.

TECHNICAL BACKGROUND

When developing electronic devices for use in zone 2 explosion-proof areas where an input voltage of greater than 80 V (in accordance with IEC 60079-7) may be used for the supply, such as 230 V mains voltage, for example, requirements are particularly specified for the circuit design and layout in accordance with hazard protection regulations. Here, separation and creepage distances need to be maintained between the components as well as between individual connections on a component, such that the power supply electronics must generally be designed discretely. Thus, modern, highly integrated power supply components, integrated power supply ICs (step-down ICs) and the like cannot be implemented. However, discretely designed power supply electronics exhibit a lower efficiency and require more space. Additionally, testing for non-conformity is more complex, as significantly more components and their distances have to be tested.

Furthermore, production costs may increase, since the probability of a component discontinuation increases due to the larger number of different components, and since the restrictions with respect to the selection of components also apply when replacing the respective components.

If power supply units with a voltage supply of 230 V are provided for the explosion-proof area, the DC link voltage in the power supply unit will generally be a voltage of over 80 V. This requires the discrete design of the power supply electronics exhibiting the disadvantages mentioned above.

It is an object of the present invention to provide an improved design for a power supply unit for supplying power to explosion-proof electronic devices, which can be constructed in a simplified manner, and in which, in particular, fewer restrictions need to be taken into account for the construction of the circuit.

DISCLOSURE OF THE INVENTION

This object is achieved by the power supply unit for the power supply of an electronic device in the explosion-proof area according to claim 1.

Further embodiments are specified in the dependent claims.

According to an aspect, a power supply for the operation of an electronic device in an explosion-proof area is provided, comprising:

a means for providing a rectified input voltage;

a DC link capacitance for buffering a DC link voltage;

a phase section control controlled to apply the rectified input voltage to the DC link capacitance during a time period in which the rectified input voltage increases and is between a lower and an upper voltage threshold, and to disconnect the rectified input voltage from the DC link capacitance during the remaining time periods;

a converter circuit configured to convert the DC link voltage into an output voltage.

Furthermore, the means for providing a rectified input voltage can comprise a passive rectifier and, in particular, an EMC protection circuit.

Generally, power supply units for the operation of electronic devices in an explosion-proof area are configured to generate a DC voltage of between 5 and 48 V from a mains voltage of 110 VAC or 230 VAC. This is often done by providing a rectified DC link voltage whose voltage level is based on the applied supply voltage, i.e. the mains voltage, and thus exceeds the voltage limit described at the beginning.

According to the present invention, the input voltage of the power supply unit is now required to be reduced to a voltage of below 80 V immediately after the rectification, e.g. by means of a phase section control, i.e. phase sector control, and to provide the input voltage as a DC link voltage. The reduced voltage can be buffered by means of a DC link capacitance.

By limiting the DC link voltage to a voltage below the voltage limit of the explosion protection voltage of 80 V, the need to provide insulation and creepage distances between the components for an installation in the explosion-proof area is avoided for the subsequent circuit parts. Thus, efficient, compact integrated power supply solutions, such as an integrated step-down converter for converting the DC link voltage into a power supply output voltage, can be used instead of having to use complex discrete solutions with lower efficiency and higher space requirements. In addition, the testing effort required to ensure compliance with the standard is enormous.

The reduction of the rectified input voltage to a voltage below the explosion protection voltage of 80 V can be achieved by means of a phase section control and the DC link capacitance.

The phase section control can be configured by means of a control circuit and a low-resistance power semiconductor switch, such as a power MOSFET. The control circuit can be configured as a simple analog circuit which, upon reaching the target voltage, i.e. upon reaching an upper voltage threshold, which is selected as a voltage slightly below the explosion protection voltage, such as between 80% and 95% of the explosion protection voltage or between 70 and 75 volts, generates a control signal to turn off the power semiconductor switch, and, at a lower voltage threshold which is selected to be lower than the upper voltage threshold, to turn on the power semiconductor switch again. Alternatively, the upper voltage threshold can be set below the explosion protection voltage depending on a predetermined power requirement, in particular of the electronic device. Here, the upper and lower voltage thresholds, the input voltage, the rectified input voltage, and the DC link voltage can be regarded as voltage specifications in terms of their magnitudes.

The control circuit can comprise a microcontroller, wherein in particular the microcontroller is further configured to control an electronic device operated by the power supply unit. Thus, the power semiconductor switch can also be switched using a microcontroller that optimizes the operating state maintains the upper and lower voltage thresholds in dependence of the input voltage of the power supply unit, the input frequency and the output power of the power supply unit. The process of optimizing the operating state can be carried out, for example, by omitting individual half-waves for charging the DC link capacitance or by selecting a voltage level of the DC link capacitance. The selected upper voltage threshold below the explosion protection voltage can then be set depending on the power requirement of the subsequent devices. In particular, the microcontroller solution can be applied if there is already a microcontroller in the electronic device, which can also be used for operating the power supply unit.

It may be provided that the phase section control is controlled to permanently apply the rectified input voltage to the DC link capacitance at input voltages below the explosion protection voltage.

Furthermore, the control unit can be configured to deactivate the phase section control when the input voltages are below the explosion protection voltage, since no voltage reduction needs to be provided for the DC link voltage.

According to a further aspect, a method is provided for operating a power supply unit for the operation of an electronic device in an explosion-proof area, wherein the power supply unit has a means for providing a rectified input voltage, a DC link capacitance for buffering a DC link voltage and a converter circuit which is configured to convert the DC link voltage into an output voltage, wherein, during a time period in which the rectified input voltage increases and is between a lower and an upper voltage threshold, the rectified input voltage is applied to the DC link capacitance, and wherein the rectified input voltage is disconnected from the DC link capacitance in the remaining time periods.

BRIEF DESCRIPTION OF THE DRAWINGS

Embodiments are explained in more detail below with reference to the accompanying drawings, wherein.

DESCRIPTION OF EMBODIMENTS

Figure 1:
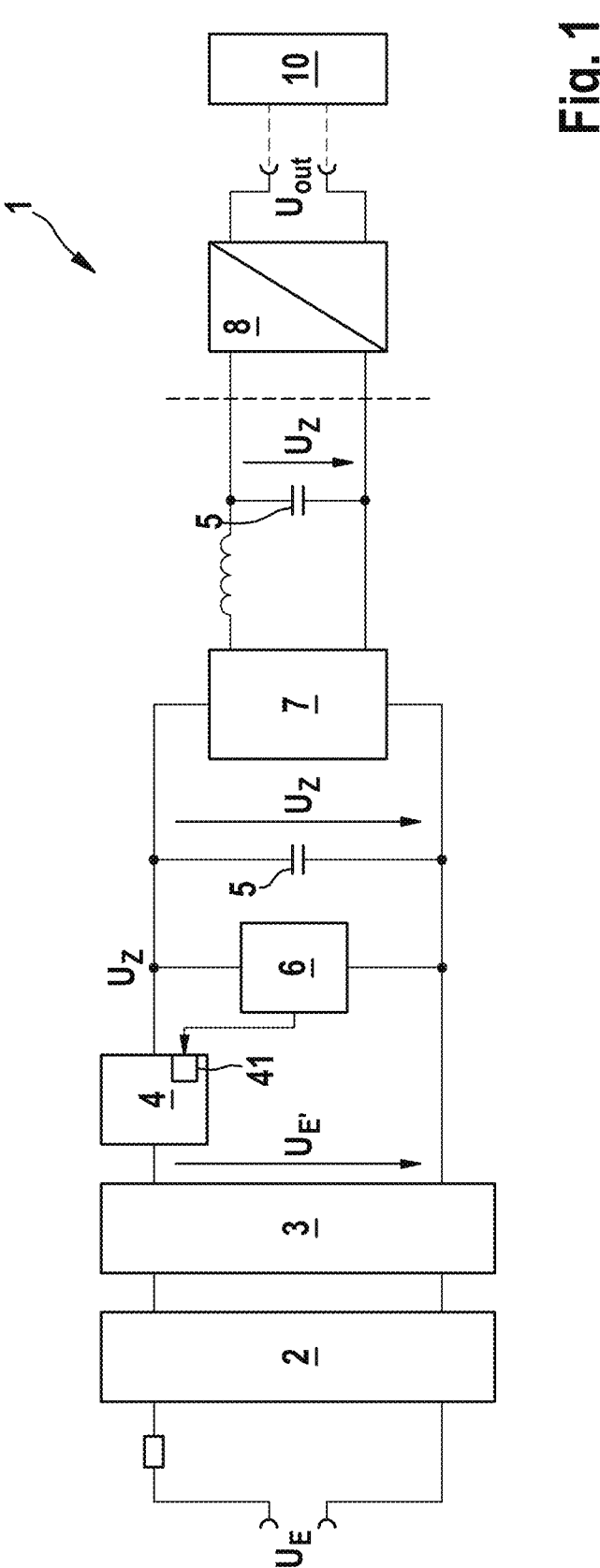
FIG. 1 is a schematic representation of a power supply unit for an electronic device for operation in an explosion-proof area according to a first embodiment.

FIG. 1 shows a schematic representation of a power supply unit 1 for an electronic device 10 that is to be operated in an explosion-proof or potentially explosive area. According to the standard specifications of IEC 60079-7, voltages above an explosion protection voltage of 80 V are only permissible in explosion-proof areas if appropriate insulation and creepage distances between components, i.e. electronic elements, are observed. The power supply unit has an input for applying an input voltage $U_E$, typically a mains voltage of 120 VAC, 230 VAC, which is rectified by means of a rectifier 2.

Interference signals are removed from the rectified voltage by means of a subsequent EMC protection circuit 3. A rectified input voltage $U_{E'}$ is now applied to the output side of the EMC protection circuit 3. Due to the mains voltage applied, the rectified input voltage $U_{E'}$ is generally higher than the explosion protection voltage, in particular of 80 V.

Next, a voltage reducer circuit 4 is provided, which can be implemented by means of a phase section control. The voltage reducer circuit 4 can connect or disconnect the rectified input voltage $U_{E'}$ to or from the DC link capacitance 5 depending on a DC link voltage $U_Z$ generated on the output side and stored in a DC link capacitance 5.

Figure 2:
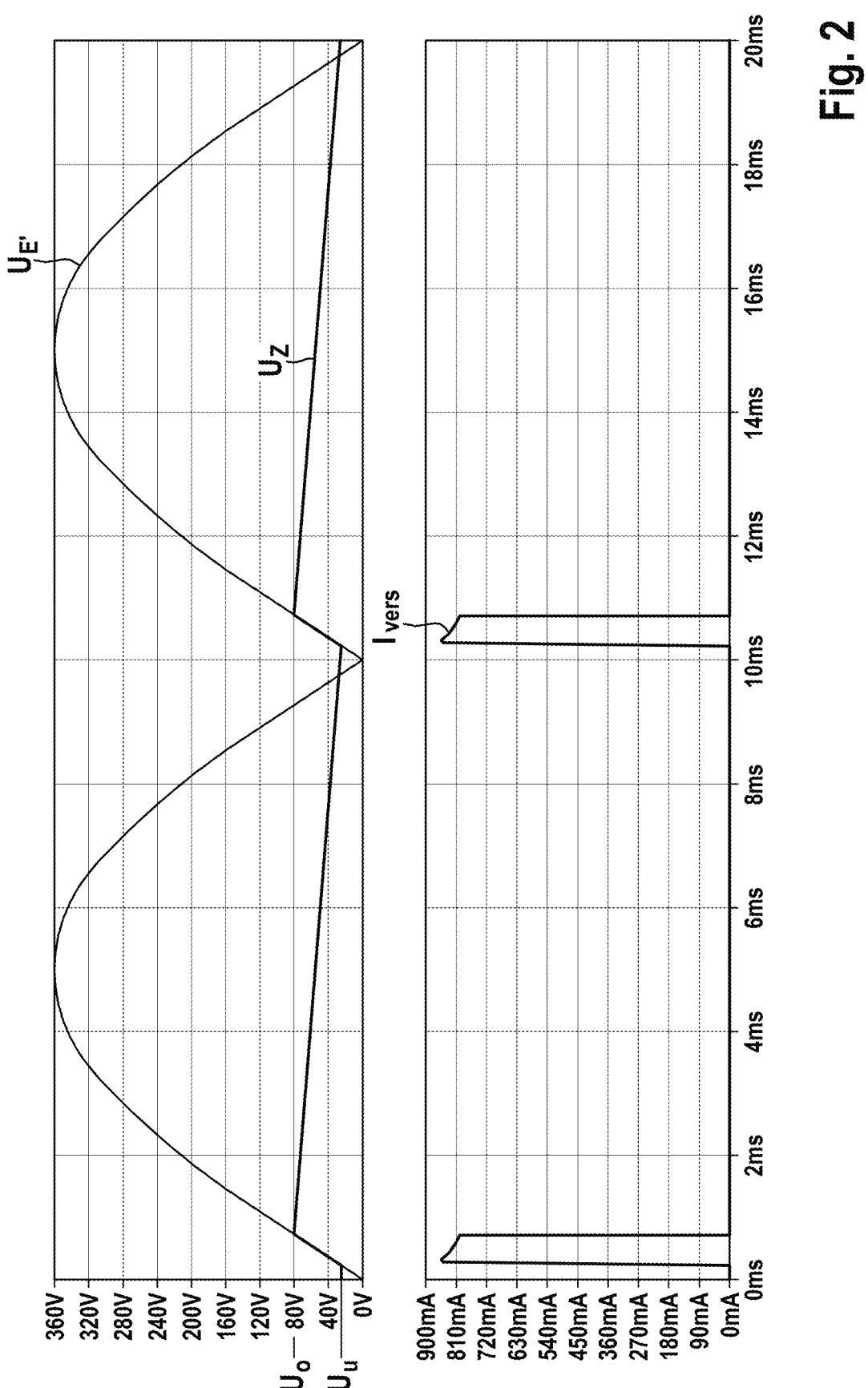
FIG. 2 is a diagram for illustrating the time characteristics of the rectified input voltage, the DC link voltage, and a capacitor current of the DC link capacitor.

The rectified input voltage $U_{E'}$ obtained after rectification has a voltage gradient with positive half-waves, as shown in the diagram of FIG. 2. The phase section control is now operated in such a way that the rectified input voltage $U_{E'}$ is applied to the DC link capacitor 5 in a suitable manner in a phase angle range of an increasing section of the rectified input voltage $U_E$; in which the current voltage value of the rectified input voltage $U_{E'}$ is between a lower $U_u$ and an upper voltage threshold $U_o$, and is disconnected from the DC link capacitor 5 outside the voltage range or in the case of a decreasing section of the rectified input voltage $U_{E'}$.

The lower voltage threshold $U_u$ is below the DC link voltage $U_Z$ to be set and therefore below the explosion protection voltage of generally 80 volts. For example, the lower voltage threshold $U_u$ can be between 60% and 70% of the explosion protection voltage, and the upper voltage threshold $U_o$, which corresponds to the DC link voltage $U_Z$ to be set, can be between 75% and 90% of the explosion protection voltage.

While the rectified input voltage $U_{E'}$ is applied, a significant charging current flows into the DC link capacitance 5, as can also be seen from the diagram shown in FIG. 2.

The phase angle range in which the rectified input voltage $U_{E'}$ is applied to the DC link capacitance 5 preferably ends with the DC link voltage $U_Z$ to be set. FIG. 2 shows the half-waves of the rectified input voltage $U_{E'}$ and the current flow to the phase angle ranges at which the rectified input voltage $U_{E'}$ is applied to the DC link capacitance 5. The control can be achieved accordingly by means of a control unit 6, which opens a power semiconductor switch 41 of the phase section control 4 as soon as the rectified input voltage $U_{E'}$ has reached the level of the upper voltage threshold $U_o$, and closes it as soon as the rectified input voltage $U_{E'}$ increases again in the next half-wave and exceeds a lower voltage threshold $U_u$. The control unit 6 can comprise a Schmitt trigger, for example.

The upper voltage threshold can correspond to the DC link voltage to be set, and, as indicated above, can be between 75% and 90% of the explosion protection voltage of 80 volts. The lower voltage threshold can be provided as a fixed value, defined relative to the upper voltage threshold, e.g. between 10%-20% below the upper voltage threshold, or can be set dependent on the load or the output current retrieved from the output side of the power supply unit. In this way, the DC link voltage $U_Z$ to be set can also be set depending on the power requirement of the connected electronic device 10.

A step-down converter 7 can be connected to the DC link capacitance 5, which reduces the DC link voltage $U_Z$ to the desired power supply output voltage for the electronic device 10 in a manner known per se. The electronic device 10 can also be connected to the power supply unit 1 via a further DC/DC converter 8 for galvanic isolation.

The step-down converter 7 be implemented particularly in an integrated design, as the requirements for insulation and creepage distances for explosion protection do not have to be met at voltage levels below the explosion protection voltage of 80 volts.

As shown in the embodiment of FIG. 1, the phase section control can be configured by means of a microcontroller as part of the control unit 6, which measures the DC link voltage $U_Z$ across the DC link capacitance 5 and, when reaching the corresponding lower voltage threshold, closes the power semiconductor switch 41 of the phase section control 4 at suitable points of time in order to charge the DC link voltage $U_Z$ with the increasing curve of the half-wave of the rectified input voltage between the lower and upper voltage thresholds $U_u$, $U_o$. When reaching the upper voltage threshold, which may correspond to the specified DC link voltage $U_Z$, the power semiconductor switch 41, which is controlled by the control unit 6/the microcontroller, is opened again, and is only closed again in a corresponding manner when the voltage of the next half-wave increases.

Depending on the power consumption by a subsequent technical device 10, the closing of the power semiconductor switch can be interrupted for one or more charging cycles if the DC link capacity 5 can provide sufficient charge for the operation of the technical device.

Furthermore, the upper voltage threshold $U_o$ can also be set depending on a power consumption. This is indicated, for example, by the degree of a gradient of the DC link voltage after opening the power semiconductor switch 41, or can be signaled directly by the electronic device 10.

In a further embodiment, the phase section control 4 can be operated without additional influence from the DC link voltage $U_Z$. This reduces the circuit complexity, but reduces the accuracy with which the upper voltage threshold $U_o$ can be achieved (e.g. by different loads and temperatures). The omission of individual charging cycles or the adaption of the voltage threshold $U_o$ to different loads cannot be implemented in this way.

Figure 3:
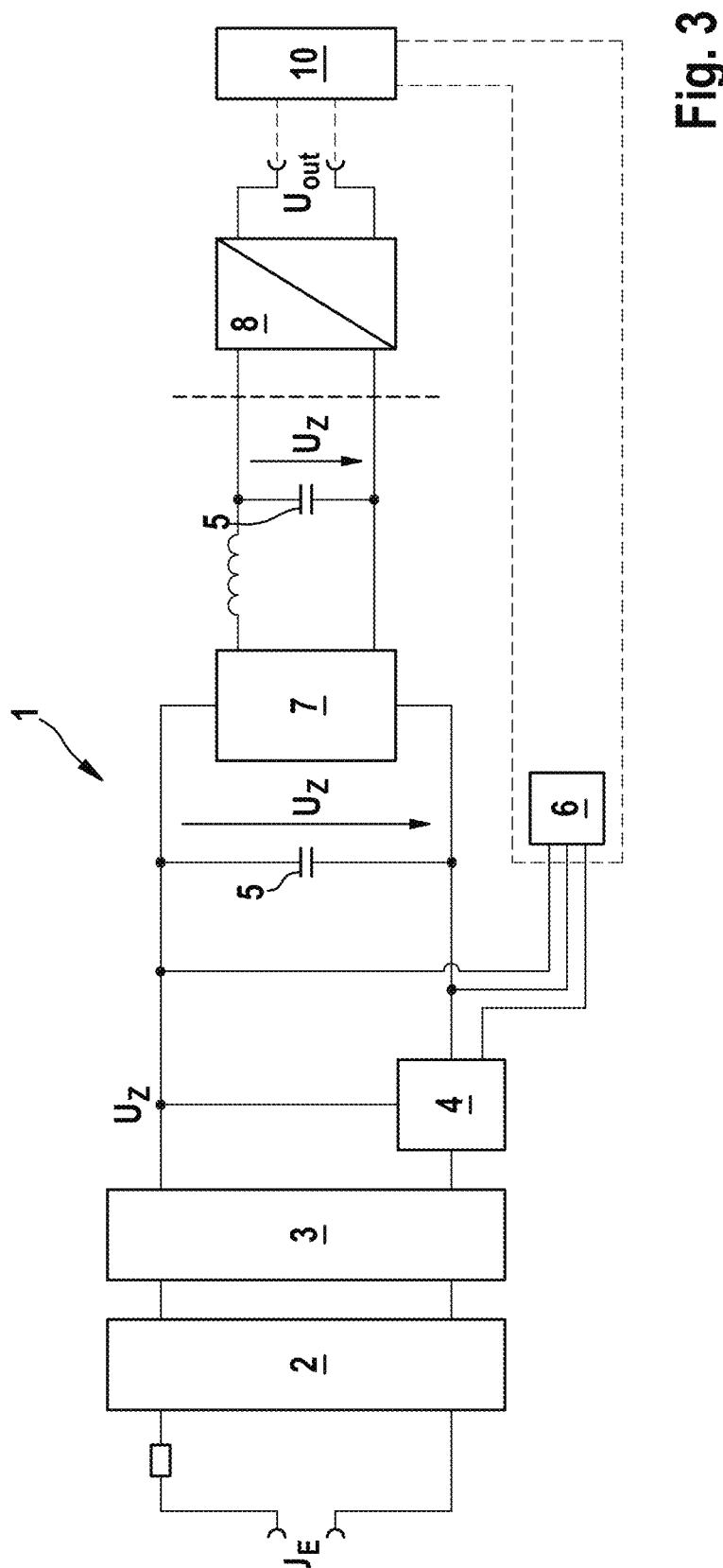
FIG. 3 is a schematic representation of a power supply unit for an electronic device for operating in an explosion-proof area according to a further embodiment.

The microcontroller control has the advantage that, as outlined in the embodiment shown in FIG. 3, the implemented function of the control unit 6 can be implemented together with a function of a microcontroller for the electronic device 10 operated by the power supply unit 1. Thus, only one control unit 6 is required, and the number of components can be significantly reduced. Such an implementation is possible in particular if the power supply unit 1 and the electronic device 10 are implemented in a common module.

Furthermore, it can be provided that at an input voltage that is below the explosion protection voltage, the voltage reducer circuit will be completely deactivated, and the input voltage will be applied directly to the DC link capacitance. For this purpose, the power semiconductor switch 41 can be permanently closed. This means that switching losses in the voltage reducer circuit can be reduced accordingly, as the voltage reducer circuit is not required to comply with the explosion protection requirements.

The invention claimed is:

1. A power supply unit for operating an electronic device in an explosion-proof area, comprising:
   a means for providing a rectified input voltage;
   a DC link capacitance for buffering a DC link voltage;
   a phase section control controlled to apply the rectified input voltage to the DC link capacitance during a time period in which the rectified input voltage increases and is between a lower and upper voltage threshold, and to disconnect the rectified input voltage from the DC link capacitance in the remaining time periods to limit the DC link voltage to a voltage below a provided explosion protection voltage limit;

a converter circuit which is configured to convert the DC link voltage into an output voltage.

2. The power supply unit according to claim 1, wherein the means for providing a rectified input voltage comprises a passive rectifier, and in particular an EMC protection circuit.

3. The power supply unit according to claim 1, wherein the upper voltage threshold is below a predetermined explosion protection voltage of in particular 80 volts, wherein the upper voltage threshold is in particular between 80% and 95% of the explosion protection voltage, or wherein the upper voltage threshold is set below the explosion protection voltage depending on a predetermined power requirement, in particular of the electronic device.

4. The power supply unit according to claim 1, wherein a control unit is configured to interrupt the closing of the semiconductor switch for one or more cycles when the voltage does not fall below the lower voltage threshold.

5. The power supply according to claim 1, wherein the converter circuit comprises a step-down converter.

6. The power supply unit according to claim 1, wherein a control circuit is configured to control the phase section control comprising a power semiconductor switch.

7. The power supply unit according to claim 6, wherein the control circuit comprises a microcontroller, wherein in particular the microcontroller is further configured to control an electronic device operated by the power supply unit.

8. The power supply unit according to claim 7, wherein the control circuit is configured to set the upper or lower voltage thresholds as a function of the input voltage of the power supply unit, the input frequency or the output power of the power supply unit, and/or not to apply the rectified input voltage to the DC link capacitance during one or more half-waves.

9. The power supply unit according to claim 1, wherein the phase section control is controlled to apply the rectified input voltage permanently to the DC link capacitance at input voltages of below the explosion protection voltage.

10. Method for operating a power supply unit for operating of an electronic device in an explosion-proof area, wherein the power supply unit has a means for providing a rectified input voltage, a DC link capacitance for buffering a DC link voltage and a converter circuit which is configured to convert the DC link voltage into an output voltage, wherein, during a time period in which the rectified input voltage increases and lies between a lower and upper voltage threshold, the rectified input voltage is applied to the DC link capacitance, and in the remaining time periods the rectified input voltage is disconnected from the DC link capacitance to limit the DC link voltage to a voltage below a provided explosion protection voltage limit.

* * * * *